United States Patent
Burzio (10) Patent No.: US 7,149,624 B2
(45) Date of Patent: Dec. 12, 2006

(54) METHOD FOR DETERMINING THE POSITION OF ONE VEHICLE WITH RESPECT TO ANOTHER VEHICLE, IN PARTICULAR FOR MOTOR VEHICLES

(75) Inventor: Gianfranco Burzio, Orbassano (IT)

(73) Assignee: C.R.F. Societá Consortile per Azioni (IT)

( * ) Notice: Subject to any disclaimer, the term of this patent is extended or adjusted under 35 U.S.C. 154(b) by 0 days.

(21) Appl. No.: 11/114,419

(22) Filed: Apr. 26, 2005

(65) Prior Publication Data
US 2006/0074548 A1    Apr. 6, 2006

(30) Foreign Application Priority Data
Oct. 1, 2004    (EP)    .................................. 04425736

(51) Int. Cl.
*G01C 21/26* (2006.01)
(52) U.S. Cl. ....................... 701/207; 701/300
(58) Field of Classification Search ........ 701/200–213, 701/300, 301; 342/350, 351, 357
See application file for complete search history.

(56) References Cited

U.S. PATENT DOCUMENTS

| | | | | |
|---|---|---|---|---|
| 4,249,176 A | | 2/1981 | Oishi et al. ................ 343/6.5 |
| 4,825,055 A | * | 4/1989 | Pollock ...................... 235/411 |
| 5,541,845 A | * | 7/1996 | Klein ......................... 701/207 |
| 6,415,227 B1 | * | 7/2002 | Lin ............................. 701/213 |
| 6,853,909 B1 | * | 2/2005 | Scherzinger ............... 701/207 |

FOREIGN PATENT DOCUMENTS

EP    1 020 834 A2    7/2000

OTHER PUBLICATIONS

European Search Report for EP 04 42 5736 (Jan. 1, 2005).

\* cited by examiner

*Primary Examiner*—Richard M. Camby
(74) *Attorney, Agent, or Firm*—Howrey LLP (57) ABSTRACT

Described herein is a method for determining the position of one vehicle with respect to another vehicle, in which the position of one vehicle with respect to the others is determined using counter means and short-range radio systems that provide for exchange of electromagnetic signals between the vehicles when these are within a pre-set range of coverage, on the basis of the calculation of the distance between the vehicles and the measurement of the their displacements in successive time intervals made by means of odometers, compasses and inclinometers.

9 Claims, 5 Drawing Sheets

METHOD FOR DETERMINING THE POSITION OF ONE VEHICLE WITH RESPECT TO ANOTHER VEHICLE, IN PARTICULAR FOR MOTOR VEHICLES

BACKGROUND OF THE INVENTION

1. Field of the Invention

The present invention relates to a method for determining the position of one vehicle with respect to another vehicle, in particular for motor vehicles.

2. Technical Background

As is known, methods have been proposed for determining the position of one vehicle with respect to another vehicle which use technologies of a radar type, or of a satellite-location type. The use of radar for applications in the automotive field presents high costs and not always adequate performance. Instead, unless costly systems are used, satellite location is unable to achieve the precision necessary for the applications that have the purpose of determining the position of one vehicle with respect to another vehicle.

BRIEF SUMMARY OF THE INVENTION

The purpose of the present invention is to provide a method for determining the position of one vehicle with respect to another vehicle, in particular for motor vehicles, which will be extremely simple and will not require complex technologies for its implementation.

The foregoing purpose is achieved by the present invention in so far as it relates to a method for determining the position of one vehicle with respect to another vehicle, characterized in that it comprises the steps of:

calculating the distance do between a first and a second vehicle at an instant $T_0$;

measuring the displacement of the first vehicle with respect to a reference system having its origin at the point where the first vehicle is located at the instant $T_0$ by detecting the position $x_{r1}$, $y_{r1}$, $z_{r1}$ of the vehicle at an instant $T_1$;

measuring the displacement of the second vehicle with respect to a reference system having its origin at the point where the second vehicle is located at the instant $T_0$ by detecting the position $x_{s1}$, $y_{s1}$, $z_{s1}$ of the vehicle at the instant $T_1$;

calculating the distance $d_1$ between the first vehicle and the second vehicle at the instant $T_1$;

measuring the displacement of the first vehicle with respect to the reference system with its origin at the point where the first vehicle is located at the instant $T_0$ by detecting the position $x_{r2}$, $y_{r2}$, $z_{r2}$ of the vehicle at an instant $T_2$;

measuring the displacement of the second vehicle with respect to the reference system having its origin at the point where the second vehicle is located at the instant $T_0$ by detecting the position $x_{s2}$, $y_{s2}$, $z_{s2}$ of the vehicle at the instant $T_2$; and calculating the distance $d_2$ between the first vehicle and the second vehicle at the instant $T_2$ and using the information regarding the distances and the positions to determine the position of one vehicle with respect to the other vehicle.

BRIEF DESCRIPTION OF THE DRAWINGS

The invention will now be illustrated with particular reference to the attached plate of drawings, which represent a preferred non-limiting embodiment thereof and in which.

DETAILED DESCRIPTION OF THE INVENTION

Figure 1:
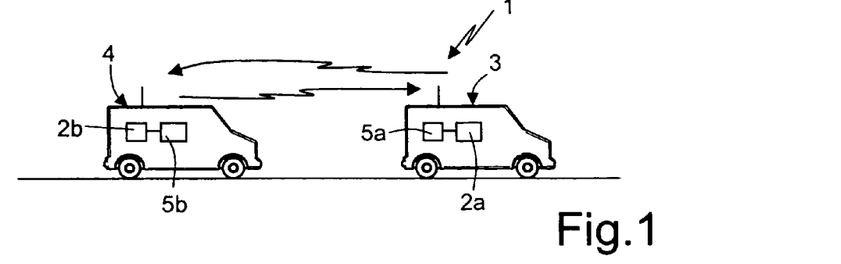
FIG. 1 is a schematic illustration of a system for determining the position of vehicles, in particular motor vehicles, which uses the method according to the present invention.

Designated, as a whole, by 1 in FIG. 1 is a system for determining the position of one vehicle with respect to another vehicle which uses the method according to the present invention.

In the example illustrated—for simplicity of description—two vehicles are shown; it is in any case clear how said system functions with any number of vehicles.

In particular, the system 1 comprises an electronic unit 2a set on board a first vehicle 3 (in particular a motor vehicle) and an electronic unit 2b set on board a second vehicle 4 (in particular a motor vehicle).

Each electronic unit 2a, 2b is provided with a short-range radio-communication system 5a, 5b (of a known type) designed to transmit in a continuous way a recognition signal of a pre-set type and designed to recognize said reference signal when it is transmitted by another vehicle.

Figure 2A:
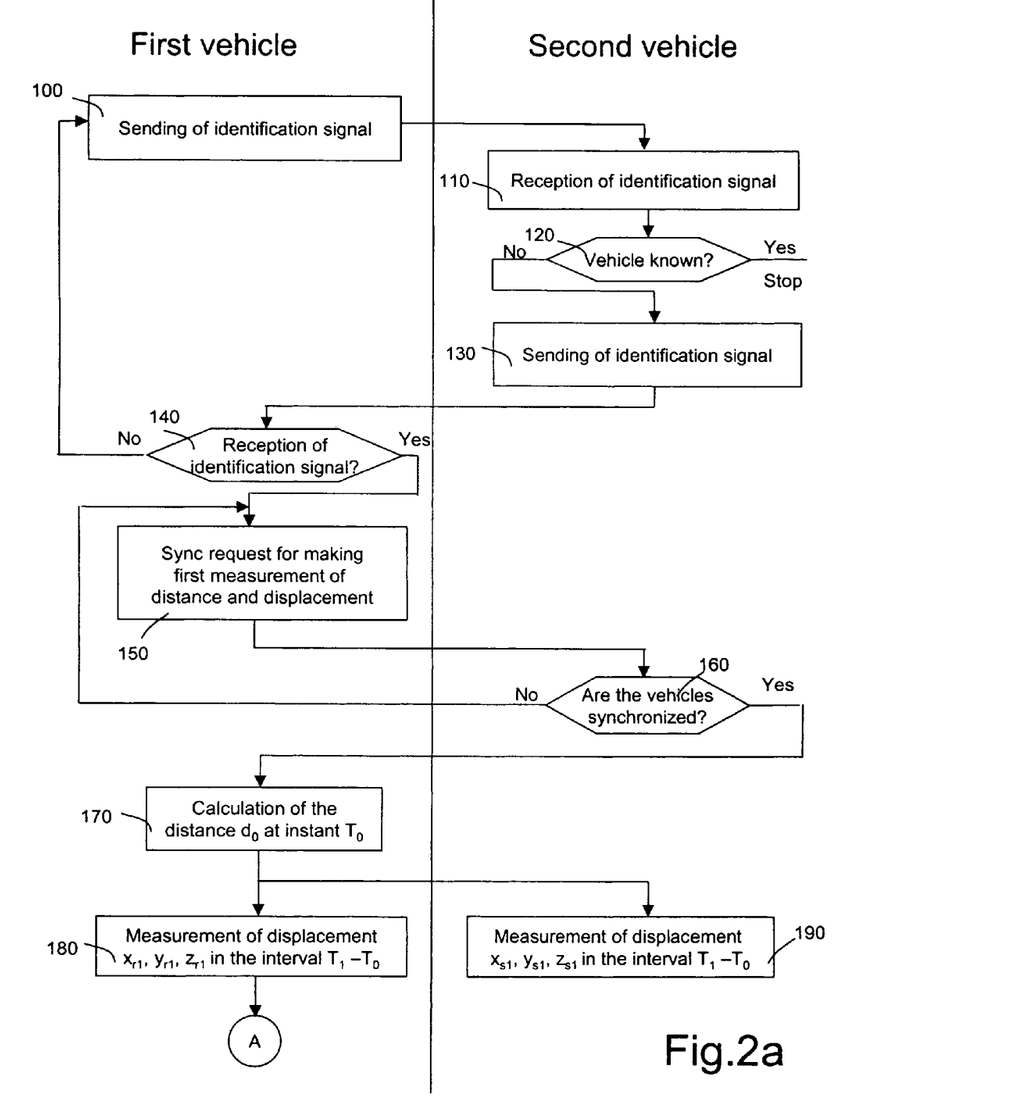
FIGS. 2a and 2b illustrate steps of the method according to the present invention regarding the calculation of the position, between two vehicles, of one vehicle with respect to the other.
Figure 2B:
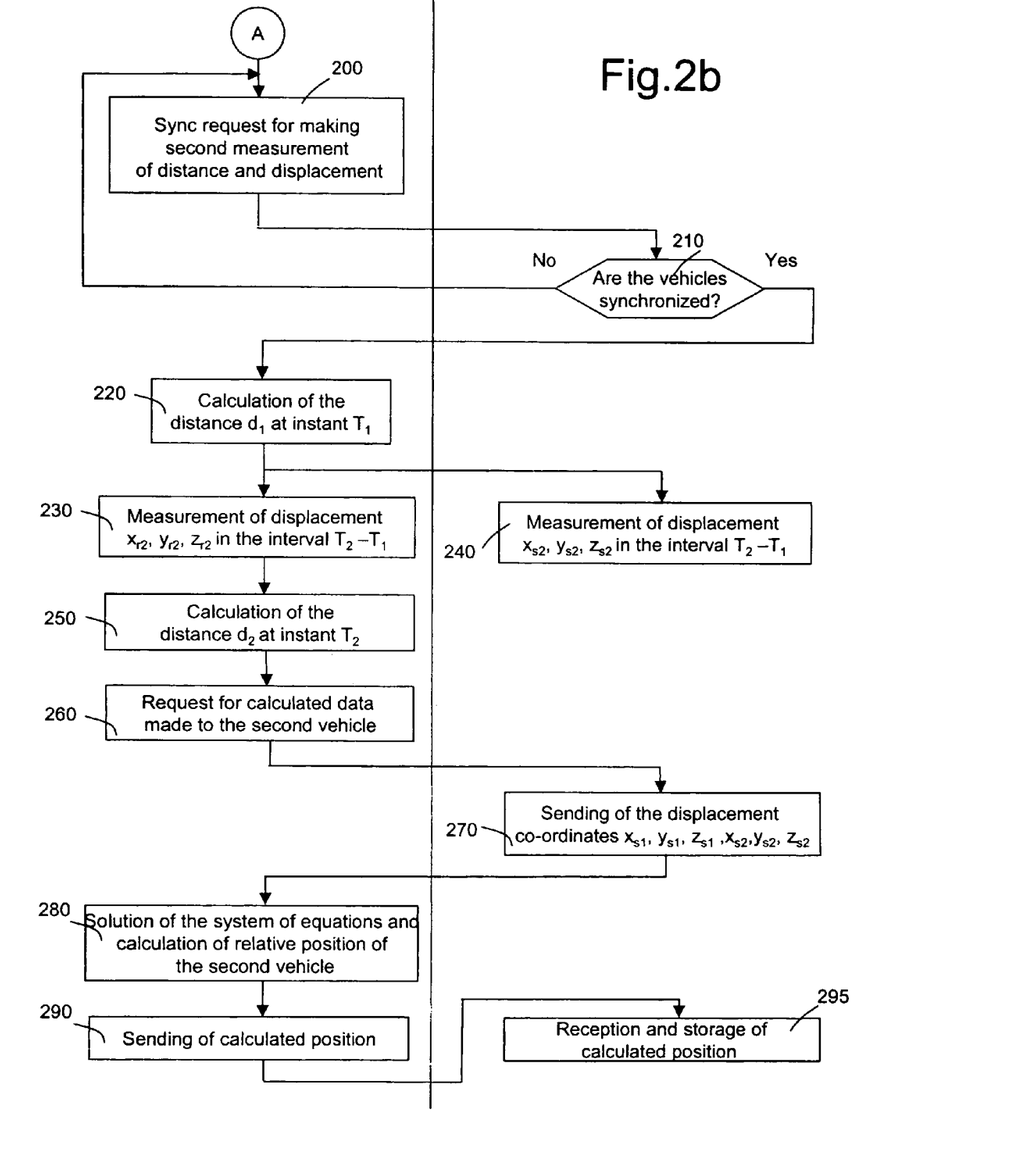

FIGS. 2a and 2b illustrate the steps of the method according the present invention regarding the calculation of the position of one vehicle with respect to the other.

Initially, the electronic unit 2a of the first vehicle sends an identification signal (block 100) by means of the short-range radio-communication system 5a, which uses an appropriate communication channel and at the same time sets itself in a state for awaiting equivalent signals arriving in response from the short-range communication system of another vehicle. This procedure can be started also between a number of pairs of vehicles simultaneously.

At the moment when a second vehicle receives said identification signal (block 110), it starts a procedure of recognition (block 120) designed to verify whether the first vehicle has already been previously located.

If the vehicle has already been identified, the location procedure is interrupted. If, instead, the vehicle has not yet been identified, the second vehicle sends an identification signal (block 130) to the first vehicle, which, in the case where the signal of identification of the second vehicle has been received (block 140), it sends a sync request to the second vehicle (block 150) for execution of a first measurement of distance and displacement.

In the case where the identification signal sent by the second vehicle has not been received, the first vehicle restarts the identification procedure (blocks 100, 140).

Following upon recognition of the sync signal on the part of the second vehicle (block 160), a signal indicating that synchronization has occurred is transmitted (output YES from block 160), and the block 160 is followed by a block 170, which calculates (with modalities that will be clarified in what follows) the distance $d_0$ between the two vehicles at the instant of synchronization $T_0$. The value measured of the distance $d_0$ is stored.

In the case where the sync signal has not been recognized (output NO from block 160) said block is followed by the block 150, which repeats the attempt to synchronize.

Following upon synchronization, the first vehicle (block 180) starts to measure its own three-dimensional displacement $x_{r1}, y_{r1}, z_{r1}$ with respect to a Cartesian reference system having its origin at the point where the first vehicle is located at the instant of synchronization $T_0$, with the axis X oriented towards the north and the axis Y oriented towards the west. As will be explained more clearly in what follows, to be able to perform the measurement of the displacement, the vehicle is provided with a compass, an odometer and an inclinometer. Simultaneously with the operations of block 180, the second vehicle (block 190) starts to measure its own three-dimensional displacement $x_{s1}, y_{s1}, z_{s1}$ with respect to a cartesian reference system having its origin at the point where the second vehicle is located at the instant of synchronization $T_0$, with the axis X oriented towards the north and the axis Y oriented towards the west.

Also in this case, to be able to perform the measurement of the displacement, the vehicle must be provided with a compass, an odometer and an inclinometer.

The two reference systems consequently each have axes X, Y and Z that are respectively parallel; i.e., the two reference systems have the same orientation.

The measurement of the displacement is carried out by the two vehicles for a pre-set time interval $T_1 - T_0$, and at the instant $T_1$ the values of displacement $x_{r1}, y_{r1}, z_{r1}$ and $x_{s1}, y_{s1}, z_{s1}$ measured are read and stored. There is thus detected the positions $x_{r1}, y_{r1}, z_{r1}$ and $x_{s1}, y_{s1}, z_{s1}$ of the vehicles at the instant $T_1$.

At the end of the operations of the blocks 180, 190, the first vehicle sends to the second vehicle a second sync request (block 200) in order to be able to perform a second calculation of the distance $d_1$ at the instant $T_1$.

After it has synchronized with the second vehicle, (block 210), the first vehicle calculates the distance $d_1$ between the vehicles at the instant $T_1$ (block 220). The value measured of the distance $d_1$ is stored.

The block 220 is followed by a block 230, which performs the measurement of the three-dimensional displacement $x_{r2}, y_{r2}, z_{r2}$ of the first vehicle with respect to the cartesian reference system, which again has its origin at the point where the first vehicle is located at the instant of synchronization $T_0$.

Simultaneously with the operations of block 230, the second vehicle (block 240) measures its own three-dimensional displacement $x_{s2}, y_{s2}, z_{s2}$ with respect to the cartesian reference system, which again has its origin at the point where the second vehicle is located at the instant $T_0$.

The measurement of the displacement is carried out by the two vehicles for a pre-set time interval $T_2 - T_0$, and at the instant $T_2$ the values of displacement $x_{r2}, y_{r2}, z_{r2}$ and $x_{s2}, y_{s2}, z_{s2}$ measured are read and stored. There is thus detected the positions $x_{r2}, y_{r2}, z_{r2}$ and $x_{s2}, y_{s2}, z_{s2}$ of the vehicles at the instant $T_2$.

The blocks 230, 240 are followed by a block 250 that carries out calculation of the distance $d_2$ between the two vehicles at the instant $T_2$. Also in this case, the value calculated of the distance $d_2$ is stored.

The block 250 is followed by a block 260, which asks the second vehicle for the results of the calculations performed in the previous measurements (block 260), i.e., the positions $x_{s1}, y_{s1}, z_{s1}$ and $x_{s2}, y_{s2}, z_{s2}$.

Said results are transmitted by a block 270. Upon receipt of the results, a block 280 calculates the position of each vehicle with respect to the other according to the three distances measured $d_0$, $d_1$, and $d_2$ and to the positions, $x_{r1}, y_{r1}, z_{r1}$, $x_{r2}, y_{r2}, z_{r2}$, $x_{s1}, y_{s1}, z_{s1}$ and $x_{s2}, y_{s2}, z_{s2}$ detected at the instants $T_1$ and $T_2$. In particular, in the preferred example of embodiment there is solved a system of equations of the type:

$$x^2 + y^2 + z^2 = d_0^2$$

$$(x - x_1)^2 + (y - y_1)^2 + (z - z_1)^2 = d_1^2$$

$$(x - x_2)^2 + (y - y_2)^2 + (z - z_2)^2 = d_2^2$$

where:

$$x_1 = x_{r1} - x_{s1} \quad x_2 = x_{r2} - x_{s2}$$

$$y_1 = y_{r1} - y_{s1} \quad y_2 = y_{r2} - y_{s2}$$

$$z_1 = z_{r1} - z_{s1} \quad z_2 = z_{r2} - z_{s2}$$

which supplies at output the values x, y and z, which represent, in the reference system of the first vehicle, the position of the second vehicle with respect to the first vehicle at the instant $T_0$.

The solution of said system of equations (i.e., the position of each vehicle with respect to the other) is then sent by the first vehicle to the second vehicle (block 290), which, after receiving it, stores it (block 295).

Figure 3:
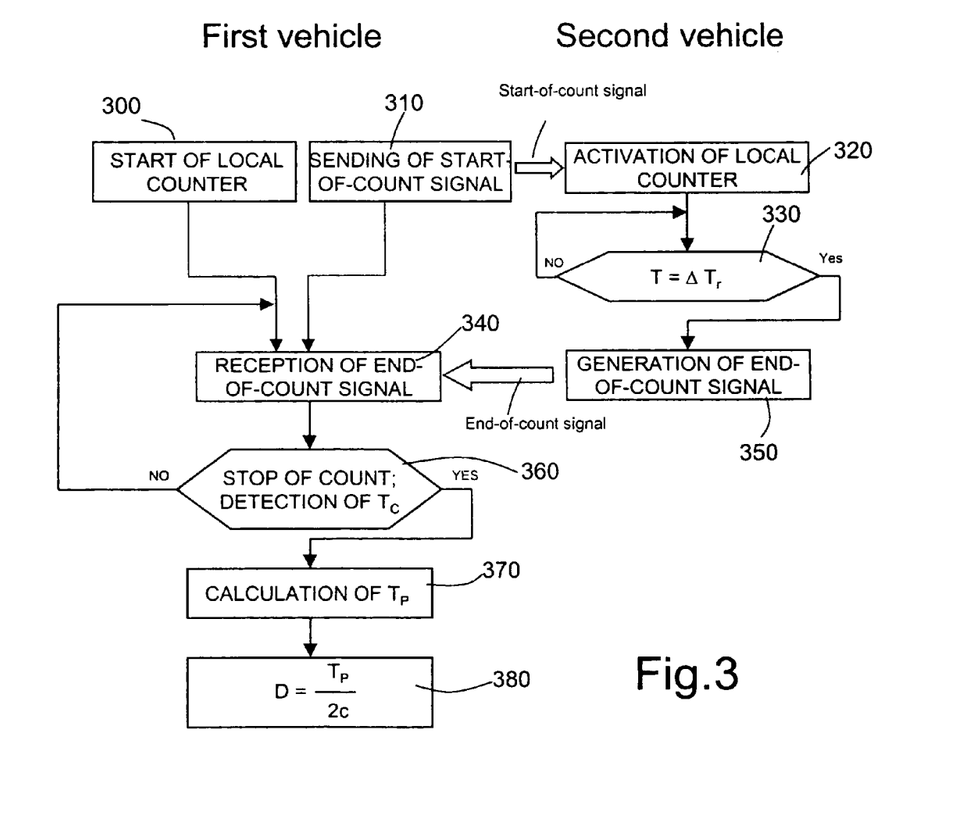
FIG. 3 illustrates the method used in the present invention for the calculation of the distance between two vehicles.

Illustrated in FIG. 3 are the operations performed in the present invention for calculation of the distance between two vehicles.

Initially, each electronic unit 2a, 2b sends (block 300) a start-of-count signal by means of the short-range radio-communication system (block 310) and at the same instant starts an internal local counter (block 300), which counts the time Tc that has elapsed from sending of the start-of-count signal.

Said start-of-count signal propagates, at a speed substantially equal to the speed of light, between the first vehicle and the second vehicle, and when received by the communication system of the second vehicle, controls activation (block 320) of an internal local counter designed to count for a pre-set time interval ΔTr.

At the end of the pre-set time interval ΔTr (block 330), the electronic unit of the second vehicle sends, by means of the short-range communication system, an end-of-count signal (block 350) to the vehicle that has generated the start-of-count signal. Said end-of-count signal propagates, at a speed substantially equal to the speed of light, between the second vehicle and the first vehicle.

The time interval ΔTr has the function of temporally separating the instants of reception and transmission of the signals of start and end of counting. In this way, it is possible to provide a simple device, in which the steps of transmission and reception of the signals must not be performed simultaneously.

When the end-of-count signal is received by the electronic unit of the vehicle that has generated the start-of-count signal (block 340), the local counter is stopped (block 360), and the time interval Tc measured by the local counter, i.e., the time elapsing between the generation of the start-of-count signal and the receipt of the end-of-count signal is detected.

Said time interval Tc is substantially equal to the pre-set time interval ΔTr increased by the time occupied for propagation from one vehicle to the other of the electromagnetic signal for start of counting and end of counting.

At this point, the electronic unit (block 370) calculates the propagation time Tp of the electromagnetic signal as the difference between the time interval Tc (measured) and the pre-set time interval ΔTr (set), namely:

$$Tp=Tc-\Delta Tr-Td$$

where Td allows for the delays that are generated in the electronic unit 2b and in the short-range communication system 5b.

Finally (block 380), the distance D between the two vehicles is calculated as:

$$D=Tp/2C$$

where C is the speed of propagation of the electromagnetic signal (equal to the speed of light), and Tp is the propagation time.

The propagation time Tp is divided by two to take into account the two-way path that the electromagnetic signal (start-of-count signal/end-of-count signal) covers between the two vehicles.

With the system according to the present invention, it is not necessary to use very precise clocks on the systems on board the two vehicles, but it is sufficient to use very precise counters, for example ones made with quartz systems.

With a nanosecond precision it is possible to make measurements with a spatial error of about 15 centimetres, which is adequate for many applications. The more precise the counter, the greater the precision of calculation of the distance.

By using the short-range communication systems, both of the vehicles can indifferently perform the operations described in the flowchart of FIG. 2, i.e., each vehicle can indifferently generate the start-of-count signal or the end-of-count signal.

The entire process can occur in very short time intervals, shorter than a ten millionth of a second. In this time interval, even though two vehicles cross one another at a very high speed, they don't move more than a fraction of millimetre.

From the description of the steps that characterize the method of the present invention (FIG. 2) it may be seen how, to obtain the position of one vehicle with respect to another, it is necessary to perform measurements that will provide data regarding the displacements made by the vehicles, in addition to the detection of the distance from one another in successive instants of time.

Figure 4:
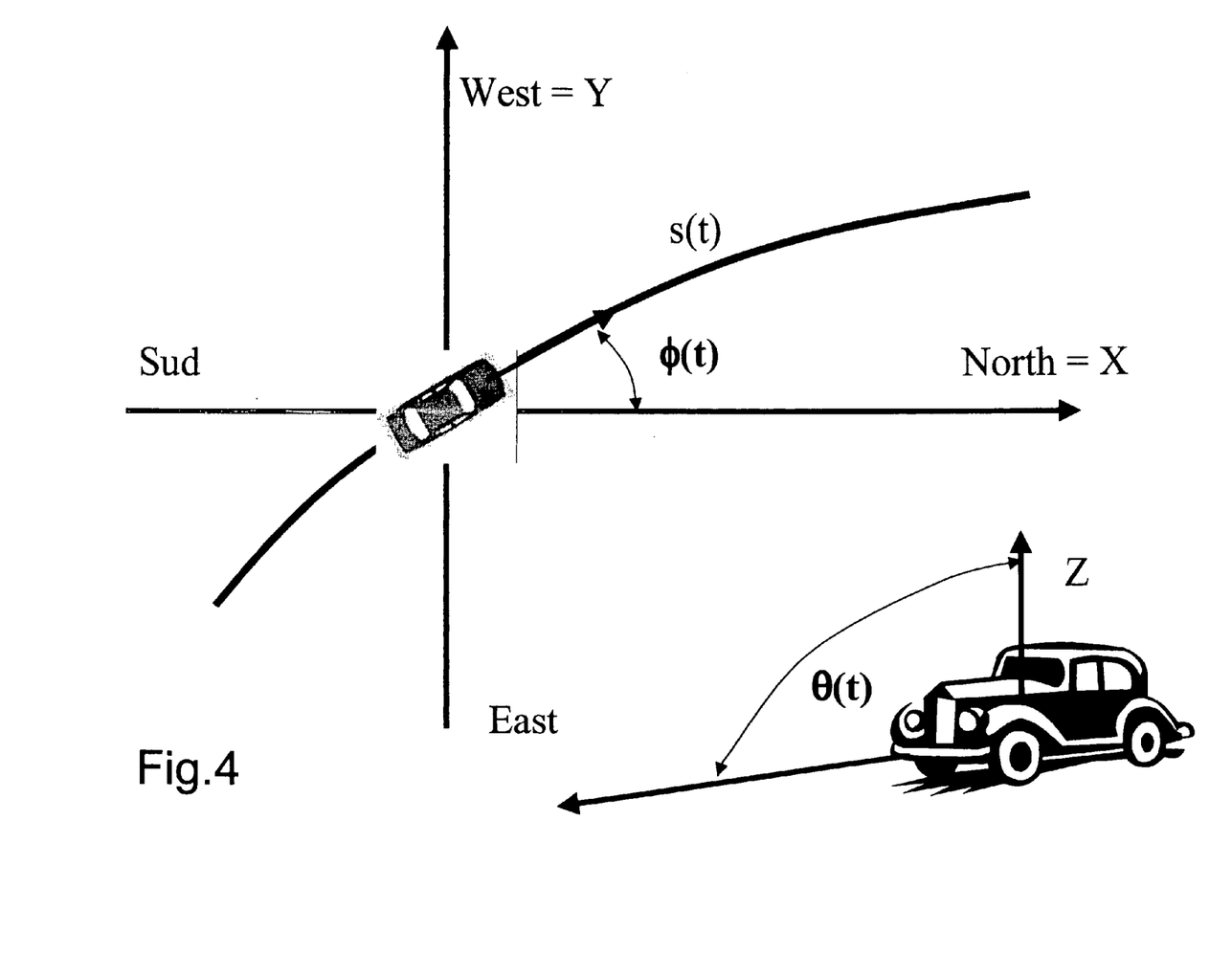
FIG. 4 shows a reference system in which the quantities that describe the displacement of a vehicle are given.

FIG. 4 shows a Cartesian reference system in which there appear the quantities that describe the displacement made by a vehicle in a time interval, detected by an odometer, a compass and an inclinometer.

In said reference system, the quantity s(t) describes the length of the displacement of the vehicle as a function of time; the quantity φ(t) is the angle, which represents the direction of the displacement made by a vehicle with respect to the axis X, oriented towards the north, on the plane (X, Y); the quantity θ(t) is the angle, which represents the slope of the stretch covered by the vehicle in the direction of the displacement with respect to the axis Z.

Assuming that, for small displacements, the values of φ(t) and of θ(t) will remain unvaried (linearization), it is possible to describe the displacement of a vehicle at the instant t via the equations:

$$\Delta x(t)=(s(t+\Delta t)-s(t))\sin\theta(t)\cos\phi(t)$$

$$\Delta y(t)=(s(t+\Delta t)-s(t))\sin\theta(t)\sin\phi(t)$$

$$\Delta z(t)=(s(t+\Delta t)-s(t))\cos\theta(t)$$

The overall displacement of a vehicle in the time interval $\Delta t=T_1-T_0$ can then be calculated by summing the individual displacements:

$$x = \sum_{n=0}^{N-1} (s(T_0+(n+1)\Delta t)-s(T_0+(n\Delta t)))\sin[\theta(T_0+n\Delta t)]\cos[\phi(T_0+n\Delta t)]$$

$$y = \sum_{n=0}^{N-1} (s(T_0+(n+1)\Delta t)-s(T_0+(n\Delta t)))\sin[\theta(T_0+n\Delta t)]\sin[\phi(T_0+n\Delta t)]$$

$$z = \sum_{n=0}^{N-1} (s(T_0+(n+1)\Delta t)-s(T_0+(n\Delta t)))\cos[\theta(T_0+n\Delta t)]$$

where $N=(T_1-T_0)/\Delta t$.

Figure 5:
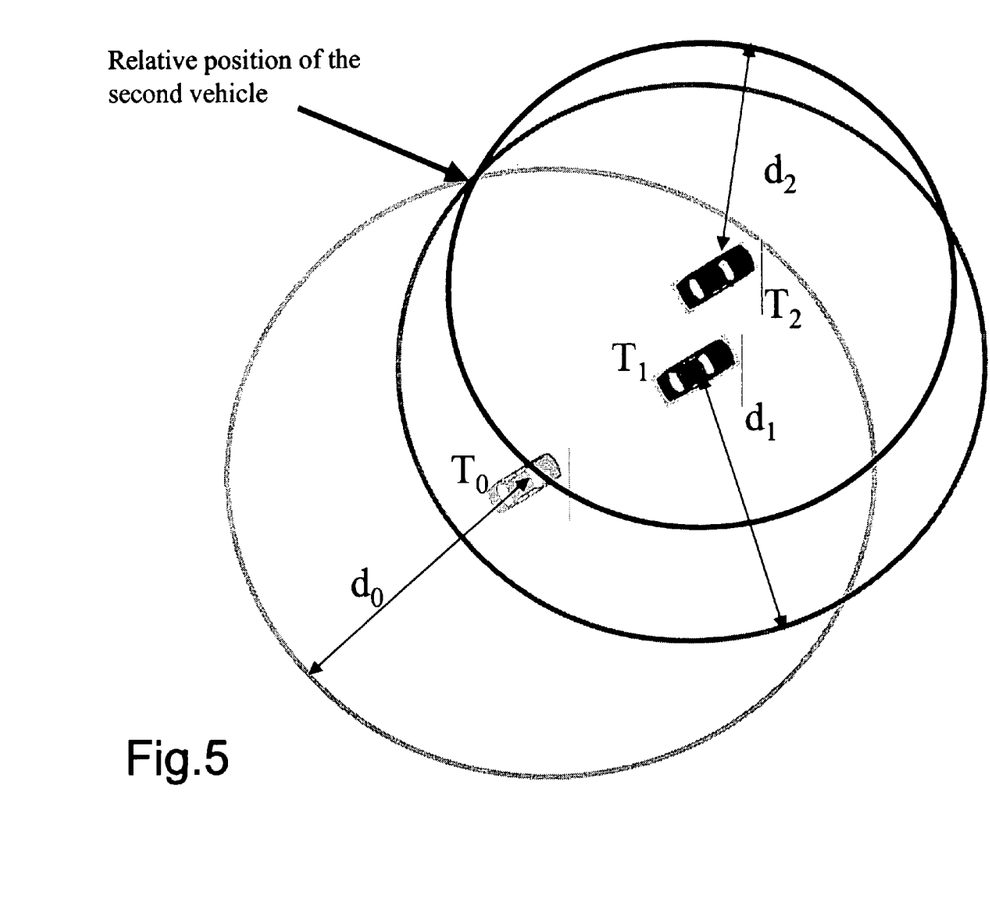
FIG. 5 illustrates considerations of a geometrical nature, on the basis of which the position of one vehicle with respect to the other is calculated using the method according to the present invention through the measurements of the distances and of the displacements.

FIG. 5 illustrates the considerations of a geometrical nature on the basis of which the position of one vehicle with respect to another is calculated with the method of the present invention using the measurements of the distances and of the displacements. In FIG. 5 the position of one vehicle with respect to the other is obtained, assuming that the first vehicle is moving and that the second vehicle is stationary. In this case, the distance do between the two vehicles, calculated at the instant $T_0$ with the method described in the present invention, can be reduced to the mathematical equation:

$$d_0^2=x^2+y^2+z^2$$

Setting, in fact, the point in which the first vehicle is located at the instant $T_0$ as the origin of a cartesian reference system of co-ordinates X, Y, Z, there exists a locus of the points in which the second vehicle may be found with respect to the first, given precisely by a sphere with a radius equal to the distance $d_0$ calculated between the two vehicles at the instant $T_0$. At the instant $T_1$, following upon a displacement of the first vehicle, the second vehicle will be found in the locus of the points described by a second sphere of radius equal to the distance:

$$d_1^2=(x-x_1)^2+(y-y_1)^2+(z-z_1)^2$$

calculated between the two vehicles at the instant $T_1$. The first and second spheres intersect in two different points, which represent the two possible loci in which the second vehicle can be found with respect to the first at the instant $T_1$. At the instant $T_2$ following upon a further displacement of the first vehicle and always assuming that the second vehicle is stationary, it is possible to obtain a third sphere with a radius equal to the distance:

$$d_2^2=(x-x_2)^2+(y-y_2)^2+(z-z_2)^2$$

which describes the locus of the points in which the second vehicle can be found at the instant $T_2$. As illustrated in FIG. 5, the three spheres intersect in a single point that coincides exactly with the position of the second vehicle that has at no time shifted with respect to the first. Said results are obtained from solving a system of equations containing the equations of the three spheres described above:

$$d_0^2 = x^2 + y^2 + z^2$$

$$d_1^2 = (x-x_1)^2 + (y-y_1)^2 + (z-z_1)^2$$

$$d_2^2 = (x-x_2)^2 + (y-y_2)^2 + (z-z_2)^2$$

A system of equations of the above kind allows of a single solution, which corresponds precisely to the position of the second vehicle with respect to the first.

Said result can be obtained also in the case where both of the vehicles are moving, on the condition that the respective reference systems, in which all the quantities that describe the displacements made by the vehicles are given and which have their origins in different points, are oriented exactly in the same way. Respect of said condition is guaranteed by the use of the inclinometer and the compass.

In this case it is sufficient to subtract from the vectors that describe the overall absolute displacements made by the first vehicle and the second vehicle in the time interval $T_2-T_0$ the vector that describes the overall absolute displacement made by the second vehicle in the time interval $T_2-T_0$ and measured starting from the instant $T_0$.

In this way, the displacement made by the second vehicle is cancelled out, and the second vehicle can be considered as having returned to the initial position corresponding to the instant $T_0$, whilst the first vehicle will be displaced into a fictitious point of co-ordinates obtained from the difference between the two displacement vectors.

The system of equations of the type:

$$x^2 + y^2 + z^2 = d_0^2$$

$$(x-x_1)^2 + (y-y_1)^2 + (z-z_1)^2 = d_1^2$$

$$(x-x_2)^2 + (y-y_2)^2 + (z-z_2)^2 = d_2^2$$

where:

$$x_1 = x_{r1} - x_{s1} \quad x_2 = x_{r2} - x_{s2}$$

$$y_1 = y_{r1} - y_{s1} \quad y_2 = y_{r2} - y_{s2}$$

$$z_1 = z_{r1} - z_{s1} \quad z_2 = z_{r2} - z_{s2}$$

supplies at output the values x, y and z, which represent, in the reference system of the first vehicle, the position of the second vehicle with respect to the first at the instant $T_0$.

The invention claimed is:

1. A method for determining the position of one vehicle with respect to another vehicle, characterized in that it comprises the steps of:
    calculating the distance $d_0$ between a first and a second vehicle at an instant $T_0$;
    measuring the displacement of the first vehicle with respect to a reference system having its origin at the point where the first vehicle is located at the instant $T_0$ by detecting the position $x_{r1}, y_{r1}, z_{r1}$ of the vehicle at an instant $T_1$;
    measuring the displacement of the second vehicle with respect to a reference system having its origin at the point where the second vehicle is located at the instant $T_0$ by detecting the position $x_{s1}, y_{s1}, z_{s1}$ of the vehicle at the instant $T_1$;
    calculating the distance $d_1$ between the first vehicle and the second vehicle at the instant $T_1$;
    measuring the displacement of the first vehicle with respect to the reference system with its origin at the point where the first vehicle is located at the instant $T_0$ by detecting the position $x_{r2}, y_{r2}, z_{r2}$ of the vehicle at an instant $T_2$;
    measuring the displacement of the second vehicle with respect to the reference system having its origin at the point where the second vehicle is located at the instant $T_0$ by detecting the position $x_{s2}, y_{s2}, z_{s2}$ of the vehicle at the instant $T_2$;
    calculating the distance $d_2$ between the first vehicle and the second vehicle at the instant $T_2$; and
    using the information regarding the distances and the positions for determining the position of one vehicle with respect to the other vehicle.

2. The method according to claim 1, in which said step of using the information regarding the distances and the positions for determining the position of one vehicle with respect to another vehicle comprises the step of solving a system of equations.

3. The method according to claim 2, in which said system of equations comprises the following equations:

$$x^2 + y^2 + z^2 = d_0^2$$

$$(x-x_1)^2 + (y-y_1)^2 + (z-z_1)^2 = d_1^2$$

$$(x-x_2)^2 + (y-y_2)^2 + (z-z_2)^2 = d_2^2$$

where:

$$x_1 = x_{r1} - x_{s1} \quad x_2 = x_{r2} - x_{s2}$$

$$y_1 = y_{r1} - y_{s1} \quad y_2 = y_{r2} - y_{s2}$$

$$z_1 = z_{r1} - z_{s1} \quad z_2 = z_{r2} - z_{s2}$$

and x, y, z represent, in the reference system of the first vehicle, the position of the second vehicle with respect to the first vehicle at the instant $T_0$.

4. The method according to claim 1, in which the reference systems of the first and second vehicles have the same orientation.

5. The method according to claim 1, in which there are moreover envisaged the steps of:
    generating an identification signal in the first vehicle and transmitting said signal to the second vehicle by means of a short-range radio-communication system belonging to the first vehicle;
    receiving a similar identification signal coming in response from the second vehicle by means of a short-range radio-communication system belonging to the second vehicle;
    forwarding a first sync request between the first vehicle and the second vehicle for execution of said calculation of distance $d_0$.

6. The method according to claim 1, in which there are moreover envisaged the steps of:
    generating, on the part of a first vehicle, the request of the data regarding the positions detected ($x_{s1}, y_{s1}, z_{s1}$; $x_{s2}, y_{s2}, z_{s2}$) by the second vehicle;
    transmitting, on the part of the second vehicle, the data requested; and
    determining the position between the first vehicle and the second vehicle on the basis of the global set of the data available.

7. The method according to claim 1, in which the calculation of the distance comprises the steps of:
    generating a start-of-count signal in a first vehicle and transmitting said signal to the second vehicle by means of a short-range radio-communication system belonging to the first vehicle by activating simultaneously an internal local counter designed to count the time Tc that has elapsed from the start of the start-of-count signal;

receiving said start-of-count signal by means of a short-range radio-communication system belonging to the second vehicle for sending a command for activation of an internal local counter, designed to count for a pre-set time interval ΔTr;

generating and transmitting, at the end of counting, an end-of-count signal to the vehicle that has generated the start-of-count signal;

stopping the counter provided on the first vehicle upon receipt of the end-of-count signal for detecting the time interval Tc elapsing between the generation of the start-of-count signal and the receipt of the end-of-count signal; said time interval Tc allows for the time occupied by the start-of-count signal and by the end-of-count signal in the propagation from one vehicle to the other;

calculating the propagation time Tp of the electromagnetic signal as the difference between the time interval Tc and the pre-set time interval ΔTr; and calculating the distance D between the two vehicles according to said propagation time Tp and to the speed of propagation of the electromagnetic waves.

8. The method according to claim 7, in which said distance D is calculated as:

$$D=Tp/2C$$

where C is the speed of propagation of the electromagnetic signal equal to the speed of light and Tp is said propagation time.

9. The method according to claim 7, in which said propagation time Tp is calculated as:

$$Tp=Tc-\Delta Tr-Td$$

where Td allows for the delays that are generated in a computerized system set on the second vehicle and designed to receive said start-of-count signal and to generate the end-of-count signal.

* * * * *